FIG. 1  FIG. 2A  FIG. 2B  FIG. 2C

TOO LOOSE

FIG. 3

TOO TIGHT

FIG. 4

PROPER

FIG. 5

United States Patent [19]

Payne

[11] 4,170,163
[45] Oct. 9, 1979

[54] VISUAL INDICATOR

[75] Inventor: William J. Payne, Greensburg, Pa.

[73] Assignee: Modulus Corporation, Chagrin Falls, Ohio

[21] Appl. No.: 819,487

[22] Filed: Jul. 27, 1977

[51] Int. Cl.² ............................ F16B 31/02; G01L 5/06
[52] U.S. Cl. ............................................. 85/62; 73/761;
116/DIG. 34; 116/212
[58] Field of Search ................... 73/88 F, 141 A, 761;
116/DIG. 34; 85/62; 52/173 R

[56] References Cited

U.S. PATENT DOCUMENTS

| | | | |
|---|---|---|---|
| 2,648,833 | 8/1953 | Wilson et al. | 116/DIG. 34 |
| 2,656,717 | 10/1953 | Fourmanoit | 85/62 X |
| 2,725,843 | 12/1955 | Koski | 116/DIG. 34 |
| 3,021,747 | 2/1962 | Garrett | 116/DIG. 34 |
| 3,137,268 | 6/1964 | Hornwood | 85/62 X |
| 3,183,762 | 5/1965 | Poupitch | 85/62 |
| 3,285,120 | 11/1966 | Kartiala | 85/62 |
| 3,323,403 | 6/1967 | Waisman | 85/62 |
| 3,383,974 | 5/1968 | Dahl | 85/62 |
| 3,490,796 | 1/1970 | Smith, Jr. | 85/62 X |
| 3,987,668 | 10/1976 | Popenoe | 73/88 F |
| 4,002,139 | 1/1977 | Payne | 116/114 R |

*Primary Examiner*—Daniel M. Yasich
*Attorney, Agent, or Firm*—Fay & Sharpe

[57] ABSTRACT

An indicator for sensing the degree of tension in a tensile member. An indicator element defined by a deformable elastomeric member is positioned within a translucent containment wall. Upon application of a tensile force to the tensile member the indicator element is caused to be compressed and expanded radially outwardly into contact with the containment wall. The degree of contact of the indicator element and the containment wall varies as a function of the amount of tension applied to the tensile member. As a consequence the appearance of the indicator element as viewed through the translucent containment wall will vary as a function of the tension applied to the tensile member.

The invention also has application in compression systems. One particular application disclosed is an indicator for sensing the appropriate degree of compression as applied to glass curtain walls used in dry pressure glazing systems.

16 Claims, 18 Drawing Figures

VISUAL INDICATOR

BACKGROUND OF THE INVENTION

This invention relates to indicators of the type wherein the application of a force to a member causes a visual change to take place in an indicator element.

In many assembly operations where fastening devices are used it is desirable to inspect the assembled fastener to determine that it has been taken up an appropriate amount. The fastener may be, for example, a stud, a bolt, a rivet or the like.

Several prior art techniques have been utilized for determining when a fastener has been properly taken up. One such technique involves the use of a torque wrench in which a specified number of foot-pounds may be verified as having been applied to the fastener in the assembly thereof. Other prior art techniques have made use of the fact that take-up of a fastener will set up certain stress levels in the fastener which may be measured as, for example, by means of a stress sensitive material. Still further prior art techniques have made use of the fact that take-up of a fastener produces an elongation of the fastener which may be measured utilizing well known techniques such as direct measuring devices.

In U.S. Pat. Nos. 3,602,186 and 3,799,108 there are shown and described indicators of the type wherein the displacement of an indicator area within fluid produces a visual change in appearance of the indicator area as viewed through a translucent window. In U.S. Pat. No. 3,908,508 there is shown and described a non-fluid indicator of the type wherein the application of stress to a member causes movement within an indicator assembly. There is thus presented a change in optical appearance of the indicator assembly which is a function of the degree of tension applied to a strain member.

This invention is directed to an all mechanical or non-fluid type indicator which includes an indicator element. The indicator element is deformable as a function of the application of a force to a strain member. As a consequence there is produced a visual indication of the degree of loading (or the absence thereof) applied to a strain member.

SUMMARY OF THE INVENTION

Briefly summarized, the preferred embodiment of the indicator of this invention comprises a tensile member which is adapted to be placed under stress. An indicator element is defined by a deformable elastomeric material and is positioned so as to surround the tensile member. A force application system is provided for application of an external force to the indicator element as a function of the tension applied to the tensile member. The force application system further includes means to apply an external force to a second indicator element as a function of the absence of tension or the degree of looseness of the tensile member. Surrounding both of the indicator elements is a transparent containment wall which, in the preferred embodiment, is generally cylindrical in shape. The relationship of the containment wall to the indicator elements is such that said elements are visible through said wall. Upon the application of tension to the tensile member there is caused to be applied an external force to one of the indicator elements causing such element to be deformed into contact with the containment wall. There is thus presented a change in optical appearance of the indicator element as viewed through the containment wall. Similarly upon reaching a specified degree of looseness in the tensile member there is caused to be applied an external force to another of the indicator elements causing said element to be deformed. There is thus presented a change in optical appearance of the said another indicator element thus providing a visual indication of the state of tension (or the absence of tension) of the tensile member.

The invention also has application to compression systems particularly anchors used in glass curtain walls mounted in dry pressure glazing systems.

BRIEF DESCRIPTION OF THE DRAWINGS

A more complete description of the invention will now be made with reference to the accompanying drawings in which:

FIG. 1 is an elevational, cross-sectional view of one embodiment of the apparatus of this invention utilizing a single indicator element;

FIG. 2(A) is a schematic view of the visual appearance presented by the indicator of FIG. 1 at design load;

FIG. 2(B) is a schematic view of the visual appearance presented by the indicator of FIG. 1 at approximately 30% of design load;

FIG. 2(C) is a schematic view of the visual appearance presented by the indicator of FIG. 1 at no load;

FIG. 3 is an elevational view, partly in section, showing a further modification of the indicator of this invention. The embodiment of FIG. 3 indicates a loose condition of the tensile member;

FIG. 4 is an elevational view, partly in section, showing the modification of FIG. 3. The structure of FIG. 4 indicates a tight condition of the tensile member;

FIG. 5 is an elevational view, partly in section, showing the modification of FIG. 3. The structure of FIG. 5 indicates a proper loading condition of the tensile member;

DESCRIPTION OF SINGLE INDICATOR ELEMENT EMBODIMENT

Before proceeding with a description of the preferred embodiment of this invention as shown in FIGS. 6–9, reference will first be made to FIG. 1 wherein there is shown a modified form of the invention incorporating a single indicator element.

The embodiment of FIG. 1 includes a tensile member 10 having one end thereof (not shown) attached to a clamping member with the other end 12 being provided with external threads 14. Threads 14 are adapted to receive an internally threaded nut 16.

A retainer ring 18 surrounds tensile member 10 and cooperates with essentially planar washers 20, 22 to define a space 24 for reception of a single indicator element 26.

In the embodiment of FIG. 1 indicator element 26 is generally circular in cross section (in an undeformed state) and is defined by any suitable elastomeric material.

Enclosing space 24 is a translucent containment wall or ring 28 defined by generally cylindrical external and internal surfaces, 30, 32.

One or more sleeves 34, 36 are positioned about tensile member 10 and cooperate with a clamping member (not shown) and nut 16 for the purpose of defining a force application means for imparting an external force to the indicator element 26.

In the embodiment as shown in FIG. 1 the indicator is in a "no load" condition. The relationship of indicator element 26 to internal surface 30 of containment ring 28 is such that in the "no load" condition the indicator element 26 is in slight engagement with the internal surface 30. This relationship of the indicator element to the internal surface 30 is shown more clearly in FIG. 2(C) wherein the line 40 denotes an area of minimum contact of the indicator element 26 with internal surface 30. Such contact may be tangential or in excess of tangential. Alternately, there may be an absence of contact between the indicator element and the containment wall at "no load".

As nut 16 of FIG. 1 is taken up the tensile member 10 is placed in a state of tension. As a result, washers 20, 22 are drawn closer together thereby causing the application of an external force to the indicator element 26. As a consequence the indicator element 26 is caused to be deformed. Because of the fact that the application of a tensile force to member 10 causes space 24 to be reduced in volume a greater portion of the external surface of indicator element 26 will be brought to bear against internal surface 30 of containment ring 28. As a result there is created a change in optical appearance of the indicator element 26 as viewed through the translucent containment ring 28. This change in appearance is shown schematically in FIGS. 2(B) and 2(A). In FIG. 2(B) there is shown schematically a band 42 which represents a degree of compression of the indicator element 26 as a consequence of partial loading. For purposes of illustration the band 42 of FIG. 2(B) indicates a 30% load condition. FIG. 2(A) shows schematically a band 44 having a greater surface area from that shown in FIG. 2(B). For purposes of illustration the optical representation of FIG. 2(A) denotes a design load condition of the tensile member 10 having been reached.

To summarize the operation of the indicator embodiment of FIG. 1, take-up of nut 16 causes a tensile force to be imparted to member 10. As a consequence there is achieved a compression of indicator element 26 as such element is captured between washers 20, 22. The degree of compression of the indicator element 26 is a function of loading. Similarly the optical appearance presented through the translucent containment ring 28 is a function of loading. The appearance of minimum area band width denotes a lack of loading or a minimal loading condition. The appearance of maximum area band width denotes a condition of increased loading. Through appropriate calibration an operator can be trained to apply proper loading to the tensile member in order to achieve a predetermined optical appearance of the indicator element 26 (i.e., band width) as viewed through the containment ring 28.

DESCRIPTION OF THE PREFERRED EMBODIMENT

Figure 6:
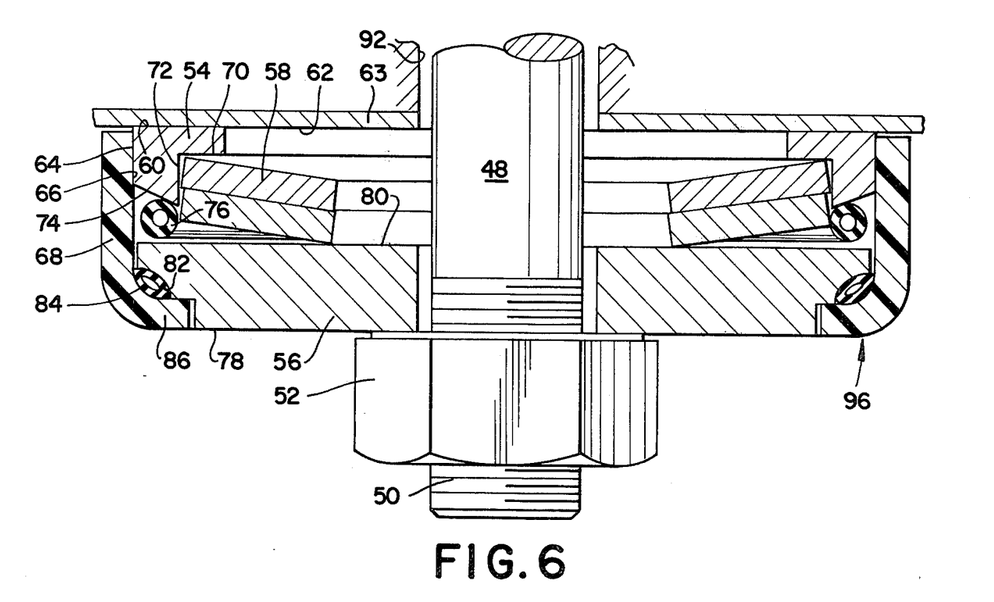
FIG. 6 is an elevational view, partly in section, showing the preferred embodiment of the invention. The indicator of FIG. 6 shows a loose condition of the tensile member.

Reference will now be made to FIGS. 6–9 wherein the preferred embodiment of the indicator of this invention will be described. Referring first to FIG. 6 there is shown a tensile member 48 having threads 50 at one end thereof for reception of nut 52. Although not shown in FIG. 6 it should be appreciated that the upper end of tensile member 48 is suitably anchored by a clamping member, insert or the like such that take-up of nut 52 causes tensile member 48 to be placed in a state of tension.

The indicator of FIG. 6 includes a pair of generally annular retainer rings 54, 56 and a spring 58 disposed between the rings. Retainer ring 54 is defined by an essentially planar surface 60 which is disposed generally transverse to the axis of tensile member 48 so as to be substantially parallel to bearing surface 62 of plate 63 against which the indicator is adapted to rest. Surface 64 of ring 54 is disposed generally parallel to the axis of tensile member 48 and is secured to the internal surface 66 of the containment wall or ring 68. Adhesive or other suitable securing means may be used to affix retainer ring 54 to the containment wall 68.

Surfaces 70, 72 of ring 54 define a recess for spring 58. Inclined surface 74 is adapted to cooperate with indicator element 76 in a manner to be described more fully below.

Containment wall 68 is generally L-shaped in cross section and is manufactured from any suitable translucent plastic material such as Lexan or the like.

Retainer ring 56 (FIG. 6) is provided with generally parallel planar surfaces 78, 80 which are disposed generally transverse to the axis of tensile member 48. Spring 58 is adapted to bear against surface 80 for a purpose to be described more fully below.

Recess 82 is provided in ring 56 for the purpose of receiving indicator element 84. Recess 82 thus cooperates with leg 86 of containment wall 68 in order to define a confined area for reception of indicator element 84.

Figure 7:
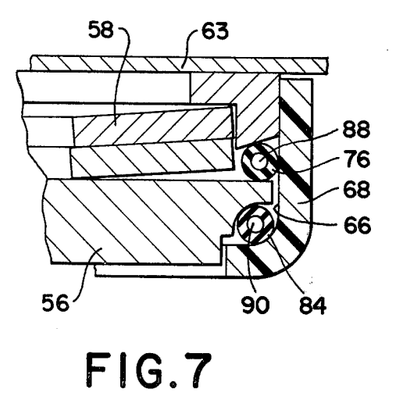
FIG. 7 is an elevational view, partly in section, showing the preferred embodiment of FIG. 6. The structure of FIG. 7 shows a no load condition of the tensile member.

As will be observed in FIG. 7 indicator elements 76, 84, in the undeformed state, are hollow having recesses 88, 90 therein. The external wall of the respective indicator elements 76, 84 is circular in cross section.

In the preferred embodiment of the invention the recesses 88, 90 of indicator elements 76, 84 are not filled but rather contain air at either atmospheric pressure or pressures other than atmospheric. In alternate embodiments recesses 88, 90 may be filled with any fluid including, but not limited to, liquids.

The environment of the preferred embodiment as shown in FIGS. 6-9 is a support system for an underground mine roof. In this regard a bore 92 (FIG. 6) is provided in the coal and rock strata defining the mine roof. Tensile member 48 is caused to be passed into bore 92 and is affixed therein by means of a suitable insert or other anchoring device (not shown). A mine roof bearing support plate 63 (FIG. 9) is disposed between the mine roof surface and the indicator assembly 96. Take-up of the apparatus of FIG. 6 is completed as nut 52 is caused to be rotated into engagement with indicator assembly 96 a degree sufficient to impart a predetermined tensile force to the bolt or tensile member 48.

This invention provides indicator means for sensing appropriate take-up of the nut 58 in the fastener configuration of FIG. 6. Alternately this invention provides for indicator means for sensing a loose condition in the fastener system.

Figure 8:
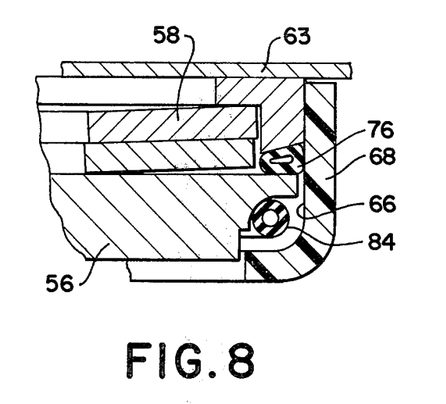
FIG. 8 is an elevational view, partly in section, showing the preferred embodiment of FIG. 6. The structure of FIG. 8 shows a load condition of the tensile member.
Figure 9:
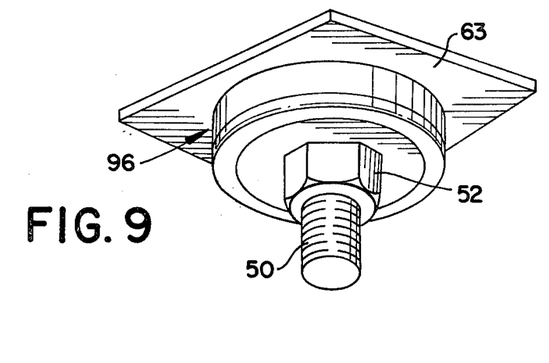
FIG. 9 is an elevational view showing the invention as embodied in FIGS. 6–8 installed in a mine roof support system.

Referring to both FIGS. 6 and 7 it can be seen that upon take-up of nut 52 (as by advancing the nut upwardly as viewed in FIG. 6) retainer ring 56 will be caused to move upwardly. A condition of proper loading is shown in FIG. 7 as indicator element 76 makes tangential contact with containment wall 68. Further take-up of nut 52 causes an overloaded condition which is shown in FIG. 8. In the condition of FIG. 8 a compressive force is exerted on the indicator element 76. The degree of compression exerted on the indicator element 76 will vary as a function of the degree of overloading. As will be evident from FIG. 8 compression of indicator element 76 causes deformation thereof with the result that the total surface area of the indicator element 76 brought into contact with the internal surface 66 of containment wall 68 will be increased. The optical effect visible through the translucent containment wall 68 is a band of color of indicator element 76 having a width that is a function of the degree of deformation or loading on the indicator element 76.

The degree of loading necessary to achieve a given clamping force can be ascertained from design considerations. The operator need merely be instructed that proper loading results when tangential contact is made by the indicator elements 76, 84 giving an optical appearance of a pair of relatively thin lines.

From a review of FIG. 7 it will be appreciated that take-up of the nut 52 (which produces an upward movement of the retainer ring 56) causes a deflection or compression in spring 58. The spring 58 in the condition shown in FIG. 8 is, therefore, exerting a downward bias on the retainer ring 56 against the loading created by nut 52.

In the event that after assembly nut 52 should later become loosened, retainer ring 56 will be caused to follow any downward travel of nut 52 (as viewed in FIG. 6) under the influence of the bias exerted by means of spring 58. To this end a critical degree of loosening of nut 52 may be monitored by means of a visual inspection of indicator element 84. A condition of extreme looseness is shown in FIG. 6. It will be noted that the downward travel of retainer ring 56 (FIG. 6) is of such an extent that indicator element 84 is caused to be collapsed or deformed into engagement with the internal surface 66 of containment wall 68. As a consequence there is presented a visual appearance of a band having a width related to the degree of compression or deformation of the indicator element 84.

It should also be appreciated from a study of FIG. 6 that loosening of nut 52 causes indicator element 76 to regain its undeformed state as retainer ring 56 moves in a downward direction out of contact with indicator element 76. With the compressive force removed through loosening indicator element 76, as shown in FIG. 6, no longer has contact with the internal surface 66 of containment wall 68. As a consequence the visual appearance exhibited by indicator element 76, as viewed through containment wall 68, differs considerably in the configuration of FIG. 6 from, for example, the configuration exhibited in FIG. 8. Thus, loosening of the nut 52 causes not only indicator element 84 to exhibit a change in optical appearance, there is also created a change in optical appearance of the indicator element 76.

To briefly summarize, the configuration of FIG. 7 shows applicant's preferred embodiment in a fully loaded condition. The configuration of FIG. 6 shows applicant's preferred embodiment in a loose condition. The embodiment of FIG. 8 shows applicant's embodiment in an overloaded condition.

Description of the Embodiment of FIGS. 3-5

Reference will now be made to FIGS. 3-5 wherein there is shown a further embodiment of applicant's invention. More specifically there is shown in FIGS. 3-5 an embodiment of applicant's invention in which indicator means are provided for the purpose of sensing an appropriate clamping force as being applied to any suitable member by means of a tensile member.

As shown in FIG. 5 applicant's modified embodiment includes tensile member 100 provided with a head 102 at one end thereof. Means are provided at the other end of tensile member 100 (not shown) for attachment of the tensile member to a clamping member or other such element. Such attachment means may include screw threads or the like.

Disposed about tensile member 100 is a retainer sleeve 104 provided with a central flange 106 and a pair of essentially cylindrical surfaces 108, 110. Indicator elements 112, 114 are disposed about retainer sleeve 104 substantially adjacent central flange 106.

Surrounding indicator elements 112, 114 is containment wall or ring 116 which, in the embodiment of FIGS. 3-5, is defined by a translucent plastic material. Ring 116 is provided with an inwardly directed flange 118 which cooperates with central flange 106 to define a variable volume space for reception of indicator element 112. Similarly annular ring 120 cooperates with flange 106 to define a variable volume space for reception of indicator element 114. Disc spring 122 is received within containment ring 116 and is adapted to bear against end surface 124 of retainer sleeve 104.

In operation the tensile member 100 of FIGS. 3-5 is caused to be inserted into a clamping member such as an internally threaded part or the like. As tensile member 100 is taken up, the undersurface of head 102 contacts end surface 126 of retainer sleeve 104. Subsequently disc spring 122 is caused to be brought into engagement with a bearing surface (not shown). Further take-up causes spring 122 to be collapsed.

The indicator of FIGS. 3–5 provides for proper take-up of the tensile member 100 without there being obtained either a "tight" or a "loose" condition. As will be evident from an inspection of FIG. 4 overtightening occurs as a result of excessive rotation of tensile member 100 which causes retainer sleeve 104 to be moved to the right to such an extent that indicator element 114 is caused to be deformed as it is captured between ring 120 and central flange 106. As a consequence indicator element 114 is expanded radially outwardly into contact with the internal surface of containment ring 116. The optical appearance presented by a "tight" condition, as shown in FIG. 4, is a relatively wide band 128 which is visible through the containment ring 116. In order to highlight the appearance of band 128 one of several colors may be used at the indicator element 114. For example the color red could be used to designate a "tight" condition.

A "loose" condition of the indicator is shown in FIG. 3. As tensile member 100 becomes loosened from its clamping member, disc spring 122 exerts a bias against retainer sleeve 104 causing the retainer sleeve to move to the left of FIG. 3. As a consequence indicator element 112 is caused to be deformed as flanges 106, 118 approach one another. As will be evident from FIG. 3 deformation of indicator element 112 causes a relatively large portion of the external surface of indicator element 112 to contact the internal wall of containment ring 116 with the result that band 130 is visible through containment ring 116.

The relationship of parts of the embodiment of FIGS. 3–5 is such that optimum tightening of tensile member 100 does not result in excessive deformation of either one of the indicator elements 112, 114. The external appearance of the containment ring 116 at optimum tightening, as is shown in FIG. 5, is an absence of indicator bands or, alternately, a pair of very thin indicator lines indicating only tangential contact of the indicator elements 112, 114 with containment ring 116.

The embodiment of FIGS. 3–5 utilizes solid elastomeric O-rings which may be suitably colored to indicate a condition of take-up or looseness. For example, the color red may be selected for indicator element 114 to indicate a "tight" condition. The color yellow may be selected for the indicator element 112 to indicate a "loose" condition. Alternate colors may be used to suit individual requirements.

Containment ring 116 of the embodiment of FIGS. 3–5 is fabricated from a clear plastic material. Lexan or its equivalent may be used.

Glass Curtain Wall Indicator

Figure 10:
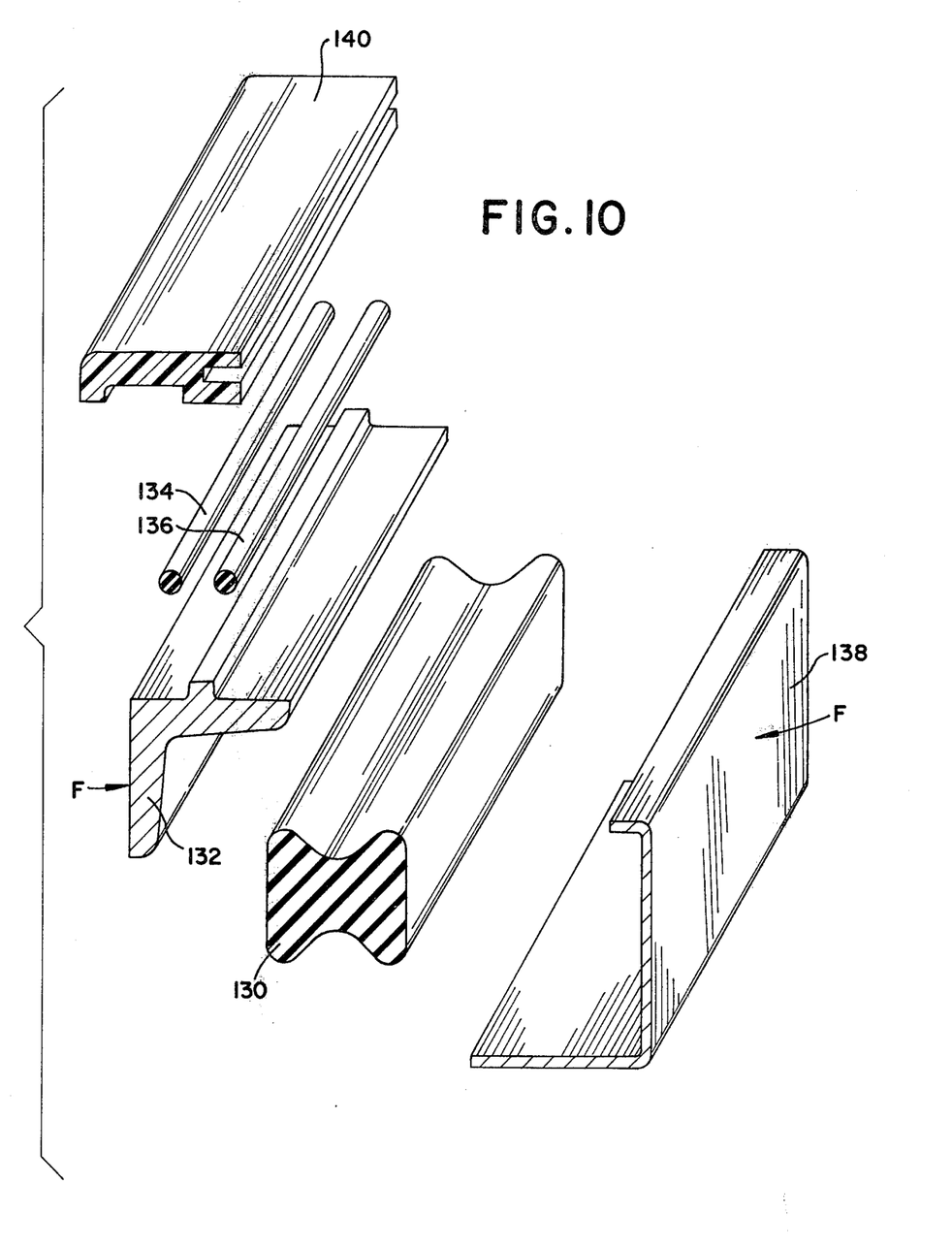
FIG. 10 is an exploded elevational view and showing the various elements of this invention as embodied in an anchor system for glass curtain walls used in dry pressure glazing systems.
Figure 11:
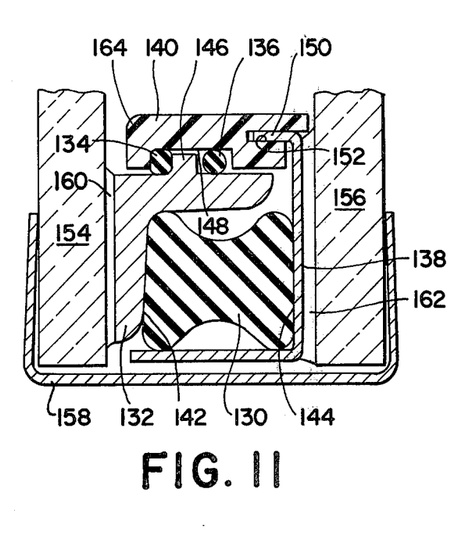
FIG. 11 is an elevational view, partly in section, showing the elements of FIG. 10 in an assembled state. The indicator of FIG. 11 shows an underload condition of the glass curtain wall.
Figure 12:
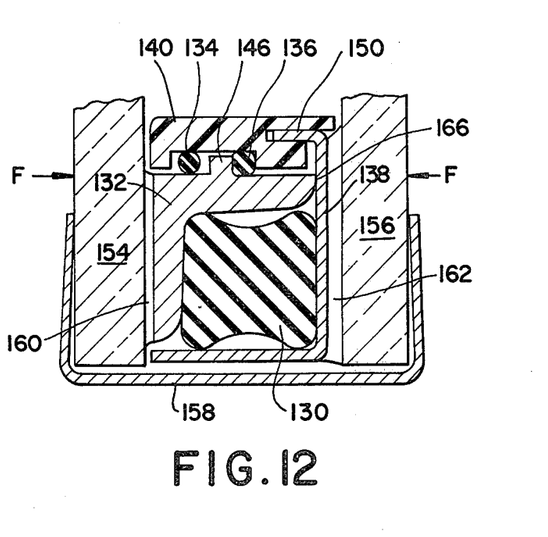
FIG. 12 is an elevational view, partly in section, showing the elements of FIG. 10 in an assembled state. The indicator of FIG. 12 shows an overload condition of the glass curtain wall.

The embodiment of FIGS. 10–12 shows a further modification of applicant's indicator as provided in an anchor assembly particularly adapted for use in glass curtain walls mounted in dry pressure glazing systems.

In the installation of glass curtain walls used in dry pressure glazing systems provision must be made for building and wall movement. The anchor design and position of the anchor must be able to compensate for wind and other forces. Without adequate compensation for movement failure of the seal or breakage of glass can be expected.

The embodiment of FIGS. 10–12 provides for a continuous monitoring apparatus for sensing and displaying the application of suitable forces on insulating glass walls.

Referring to FIG. 10 the various components of the curtain wall indicator are shown in an exploded view. These components include a gasket and spring element 130, actuator 132, indicator elements 134, 136, retainer 138 and containment element 140.

Referring to FIG. 11 it will be seen that the gasket and spring element 130, which is fabricated from an elastomeric material, is bonded to actuator 132 at bond 142. Similarly gasket and spring element 130 is bonded to retainer 138 at bond 144.

Indicator elements 134, 136, defined by soft rubber rods, are disposed on either side of rib 146 defined by actuator 132. Indicator elements 134, 136 are further retained in place by groove 148 which is defined in the clear plastic, partially silvered, containment wall or element 140. Containment element 140 is, in turn, mounted to retainer 138 by means of lip 150 which is locked in groove 152. Adhesive or other holding means may be used to anchor lip 150 in groove 152.

The indicator of FIG. 11 is disposed between a pair of generally parallel glass panels or sheets 154, 156 which are disposed within spring clip 158. It should be understood that actuator 132 is bonded or otherwise secured to glass sheet 154 at bond 160. Similarly, retainer 138 is secured to glass sheet 156 at bond 162.

FIG. 11 shows an underload condition in the glass anchor sealing system. FIG. 12 shows an overload condition.

Referring first to FIG. 11 it will be seen that gasket and spring element 130, when installed, is caused to exert a bias against actuator 132 and retainer 138 causing these elements to spread apart. As a consequence indicator element 134 is caused to be compressed and deformed between flange 164 of containment element 140 and rib 146 of actuator 132.

It should be understood that in the condition of FIG. 11 deformation of indicator element 134 (which is caused by the bias force exerted by gasket and spring element 130) takes place with no compressive loading on the glass curtain wall system. That is to say, with the glass curtain wall at rest and under no load there is achieved deformation of the indicator element 134 which produces an optical appearance in the form of a relatively wide band visible through the transparent containment element 140. The indicator element 136 is not visible through containment element 140 at no load.

As the glass curtain wall is installed a compressive or clamping force is applied by suitable clamping members (schematically represented as by the letter F in FIG. 12) as indicated by the arrow direction of FIG. 12. Application of a compressive force causes actuator 132 to move to the right of FIG. 12 while retainer 138 (with the attached containment element 140) moves to the left. As a consequence of loading the compressive or deformation force exerted on indicator element 134 at no load (by element 130) is gradually lessened with an increased clamping force F applied to the glass curtain wall system. Eventually increased loading causes indicator element 134 to assume an undeformed state as shown in FIG. 12. Further loading causes rib 146 to move to the right of FIG. 12 until such time as there is achieved compression or deformation of indicator element 136. This condition is shown in FIG. 12. Compression of indicator element 136 produces an optical appearance through containment element 140 of a relatively wide band indicating an overload condition having been reached in the glass curtain wall anchor system.

Correct or optimum loading of the curtain wall is achieved when neither indicator element 134, 136 is compressed; there thus being presented no optical band appearance through containment element 140. By providing for a partially silvered surface at element 140 the respective indicator elements 134, 136 may be masked in the undeformed state.

Overtravel or extreme loading of the curtain wall system is prevented by edge 166 of actuator 132 contacting retainer 138 as is shown in FIG. 12.

Assuming that indicator elements 134, 136 have a 1/16" cross section, total movement for full indication is approximately 0.013".

The system of FIGS. 10-12 provides an indicating feature incorporated in an assembly of components that, when installed, provides the dual function of load indicator and separating segment in an insulating glass wall anchor system. The indicator provides for a continuous monitoring of the clamping force on the insulating glass wall system giving a positive visual appearance of both an overload and underload condition.

Further Modifications of the Invention

Figure 13A:
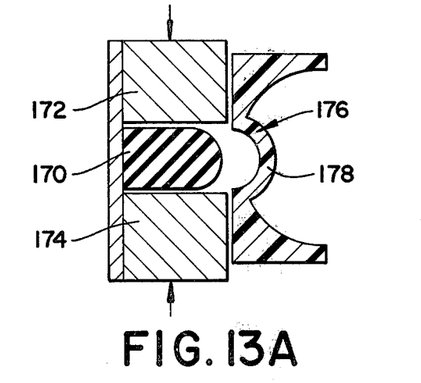
FIG. 13(A) is a schematic representation of a modified form of an indicator element and containment wall of this invention with the indicator in a no load condition.
Figure 13B:
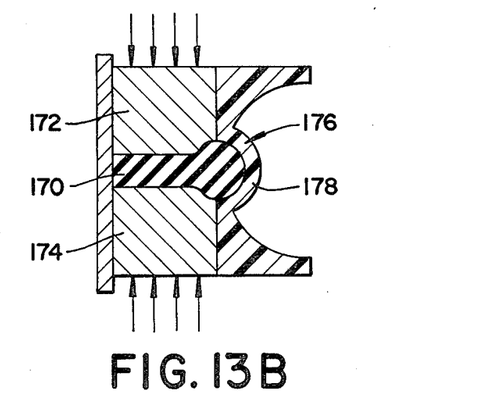
FIG. 13(B) is a schematic representation of the indicator element and containment wall of FIG. 13(A) with the indicator in a load condition.

Reference will now be made to FIGS. 13(A) and 13(B) wherein modifications of the indicator element and containment wall of applicant's invention are shown. In FIG. 13(A) there is depicted, somewhat schematically, a no load condition of the indicator wherein a generally annular indicator element 170 is shown positioned between elements 172, 174. The application of a compressive force to elements 172, 174 in the arrow direction shown in FIGS. 13(A) and 13(B) causes indicator element 170 to be compressed radially outwardly into engagement with the internal surface of containment wall 176. Due to the nature of the annular protrusion 178 in containment wall 176 there is presented an enhanced optical appearance to a viewer of the fact that indicator element 170 is under sufficient load to be expanded outwardly into contact with the containment wall.

Figure 14A:
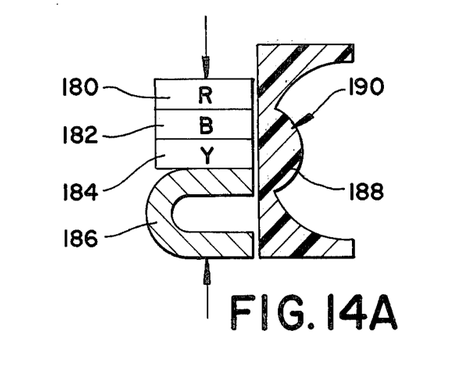
FIG. 14(A) is a schematic view of a further modification of the indicator element and containment wall of the invention in a no load condition.
Figure 14B:
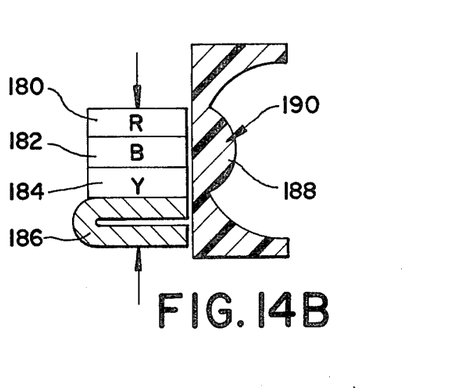
FIG. 14(B) is a schematic view of the indicator element and containment wall of FIG. 14(A) with the indicator in a load condition.

In FIGS. 14(A) and 14(B) there is shown a further modification of the indicator element and containment wall of applicant's invention utilizing a plurality of multicolored elements which are movable in response to the application of stress to a strain member. More particularly there is shown in FIG. 14(A) indicator elements 180, 182 and 184 which are secured together in a laminate. Each of the indicator elements is colored with its own unique color. For example, the colors red, blue and yellow may be selected. A spring element 186 is provided adjacent the indicator elements. The application of a compressive force in the arrow direction shown in FIG. 14(A) causes the indicator elements 180, 182, 184 to move in a downward direction past a viewing area 188 defined in containment wall 190. The particular color visible through the viewing area 188 will vary as a function of the degree of translation of the indicator elements in response to the compressive force applied thereto. In the structure of FIG. 14(A) the color yellow will be visible through the viewing area 188. Upon the application of a compressive force as shown in FIG. 14(B) the color blue will be visible through the viewing area 188. The application of a further compressive force will cause the color red to be brought into the vicinity of the viewing area where it will be visible by an observer.

What is claimed is:

1. An indicator for sensing the degree of tension in a tensile member comprising in combination:
    an indicator element, said element being deformable in response to the application of an external force;
    force application means to apply an external force to said indicator element as a function of the tension applied to said tensile member;
    containment means parallel to the longitudinal axis of the tensile member and adjacent said indicator element, said containment means having a viewing area in an exterior side wall thereof;
    the relationship of said indicator element to said containment means being such that the application of tension to said tensile member causes an external force to be applied to said indicator element with the result that said indicator element is caused to be deformed thus presenting a change in optical appearance at said viewing area.

2. The invention of claim 1 in which said indicator element is defined as an elastomeric member.

3. The invention of claim 2 in which said elastomeric member is circular in cross section.

4. The invention of claim 3 in which said elastomeric member is solid throughout its cross section.

5. The invention of claim 3 in which said elastomeric member is hollow.

6. The invention of claim 5 in which said elastomeric member is fluid filled.

7. The invention of claim 1 in which said containment means is defined as an essentially cylindrical wall of translucent material surrounding said indicator element.

8. The invention of claim 1 in which said force application means is defined as a pair of essentially planar surfaces, one movable with respect to the other, said surfaces being defined on either side of said indicator element.

9. The invention of claim 8 in which said surfaces are substantially parallel.

10. The invention of claim 9 in which said surfaces are defined by washers concentrically disposed about said tensile member and said force application means is defined by a nut element which makes operative contact with at least one of said washers.

11. An indicator for sensing the degree of tension in a tensile member comprising in combination:
    first and second indicator elements, said elements being deformable in response to the application of an external force;
    first force application means to apply an external force to said first indicator element as a function of the tension applied to said tensile member;
    second force application means to apply an external force to said second indicator element as a function of the absence of tension in said tensile member;
    containment means parallel to the longitudinal axis of the tensile member and adjacent said first and second indicator elements, said containment means having a viewing area in an exterior side wall thereof;
    the relationship of said first and second indicator elements to said containment means being such that the application of tension to said tensile member causes an external force to be applied to said first indicator element with the result that said first indicator element is caused to be deformed thus presenting a change in optical appearance at said viewing area, the absence of tension in said tensile member causing an external force to be applied to said second indicator element with the result that said second indicator element is caused to be deformed thus presenting a change in optical appearance of said viewing area.

12. The invention of claim 11 in which said first and second indicator elements are defined as elastomeric members.

13. The invention of claim 11 in which said first force application means is defined as a pair of surfaces, one movable with respect to the other, said surfaces being defined on either side of said first indicator element, the movement of one surface with respect to the other being in relation to the degree of tension applied to said tensile member.

14. The invention of claim 11 in which said second force application means is defined as a pair of surfaces, one movable with respect to the other, said surfaces being defined on either side of said second indicator element, the movement of one surface with respect to the other being in relation to a bias force exerted against at least one of said surfaces.

15. The invention of claim 14 in which said bias force is defined by a spring operatively engaging at least one of said surfaces.

16. An indicator for sensing the degree of tension in a threaded member comprising in combiation:

first and second generally elastomeric indicator elements, said elements having, in an undeformed state, a substantially circular cross section;

first and second substantially annular retainer rings, said retainer rings being disposed substantially concentric with the axis of said threaded member;

a substantially annular translucent containment wall parallel to the longitudinal axis of the tensile member and surrounding said first and second indicator elements and said first and second retainer rings;

said first indicator element being disposed substantially between said first and second retainer rings, the relationship of said first indicator element to said first and second retainer rings being such that upon movement of said retainer rings toward one another said first indicator element is caused to be deformed in an essentially radial direction into contact with said containment wall;

a nut engaging said threaded element, said nut being in operative engagement with at least one of said retainer rings whereby upon take-up of said nut said first and second retainer rings are moved toward one another thereby to deform said first indicator element;

a bias spring operatively engaging at least one of said retainer rings, said bias spring exerting a bias opposite to that imparted to its associated retainer ring by said nut;

means cooperating with at least one of said retainer rings to confine said second indicator element;

whereby, the loss of tension in said threaded member results in said bias spring causing a movement of the retainer ring associated with said second indicator element producing deformation of said second indicator element, there being achieved a change in optical appearance of said second indicator element through said containment wall.

* * * * *